(12) United States Patent
Murakami

(10) Patent No.: US 8,016,497 B2
(45) Date of Patent: Sep. 13, 2011

(54) IMAGE PICKUP APPARATUS

(75) Inventor: Taro Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 12/559,164

(22) Filed: Sep. 14, 2009

(65) Prior Publication Data

US 2010/0067896 A1   Mar. 18, 2010

(30) Foreign Application Priority Data

Sep. 16, 2008   (JP) .................................. 2008-236454

(51) Int. Cl.
  *G03B 9/40*   (2006.01)

(52) U.S. Cl. ........................................ 396/484; 352/207
(58) Field of Classification Search .................. 396/435, 396/448–450, 452, 483, 484; 352/204, 207; 348/367

See application file for complete search history.

(56) References Cited

U.S. PATENT DOCUMENTS

| 6,419,407 | B1 | 7/2002 | Nakazawa | |
|---|---|---|---|---|
| 7,128,480 | B2 * | 10/2006 | Tanaka et al. | 396/448 |
| 7,628,553 | B2 * | 12/2009 | Miyoshi | 396/448 |

FOREIGN PATENT DOCUMENTS

| JP | 2001-083575 | 3/2001 |
|---|---|---|
| JP | 2007-102086 | 4/2007 |

* cited by examiner

*Primary Examiner* — Clayton E Laballe
*Assistant Examiner* — Autumn Parker
(74) *Attorney, Agent, or Firm* — Cowan, Liebowitz & Latman, P.C.

(57) ABSTRACT

The image pickup apparatus includes a lens barrel, and two barrier blade groups each configured to include a first barrier blade, a second barrier blade and a third barrier blade, each barrier blade group being movable between a closing position for covering a front face of the lens barrel and an opening position for opening the front face of the lens barrel. In each of the barrier blade groups at the opening position, the first and second barrier blades overlap with each other in an optical axis direction of the lens barrel, and the third barrier blade overlaps with the first and second barrier blades in a direction orthogonal to the optical axis direction without overlapping therewith in the optical axis direction.

7 Claims, 13 Drawing Sheets

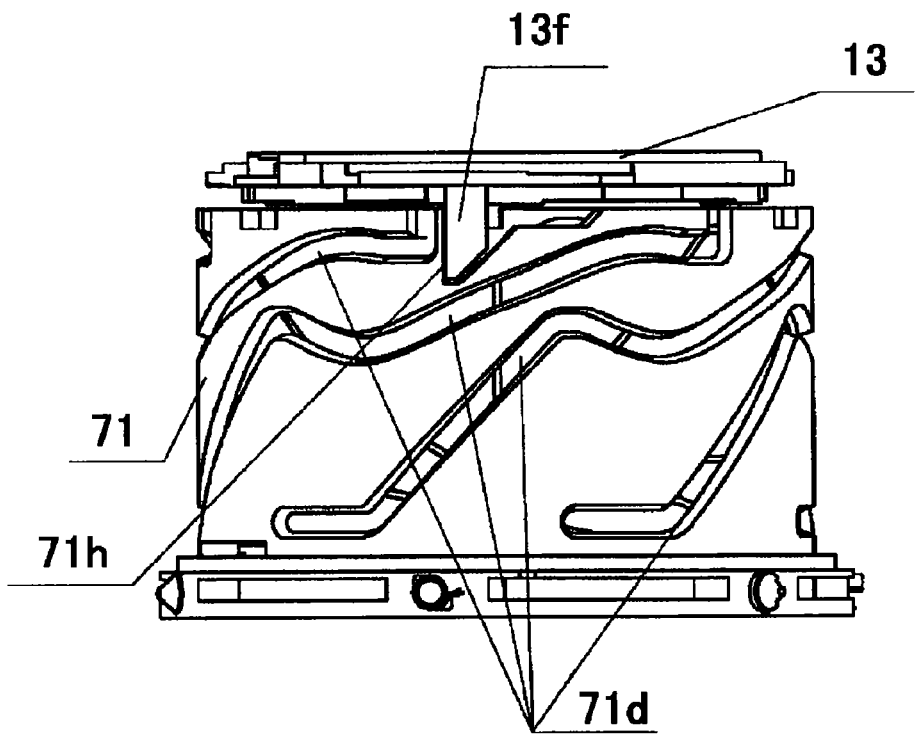
FIG. 10
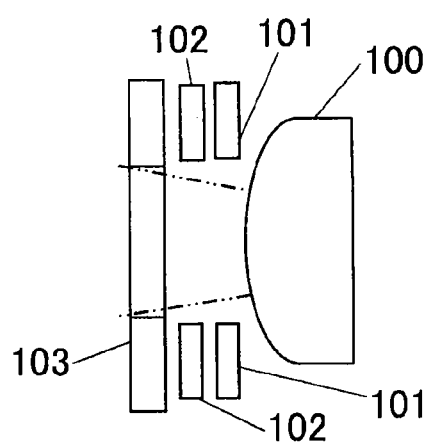
FIG. 11 *(PRIOR ART)*

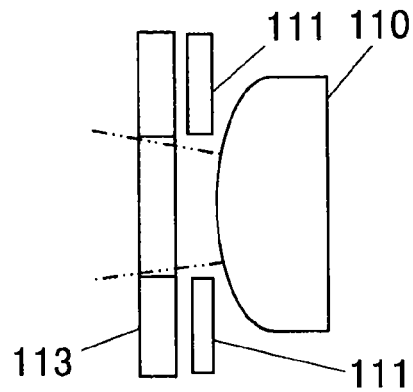
FIG. 12 *(PRIOR ART)*
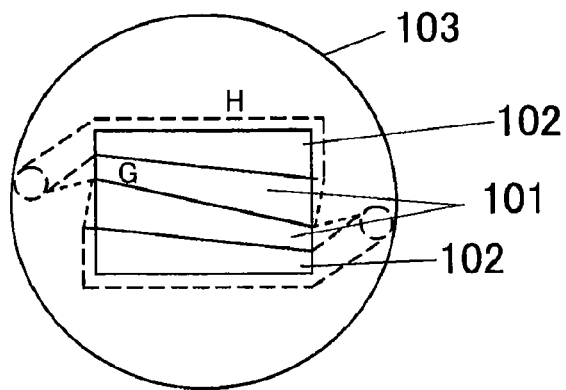
FIG. 13 *(PRIOR ART)*
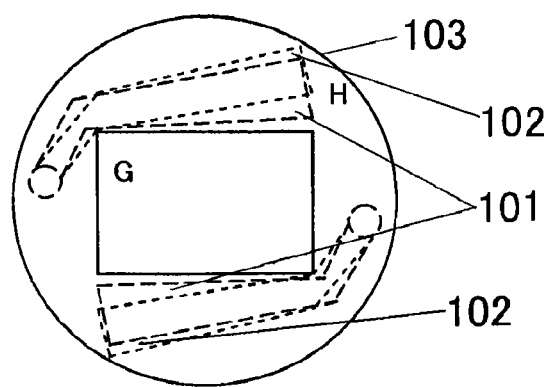
FIG. 14 *(PRIOR ART)*

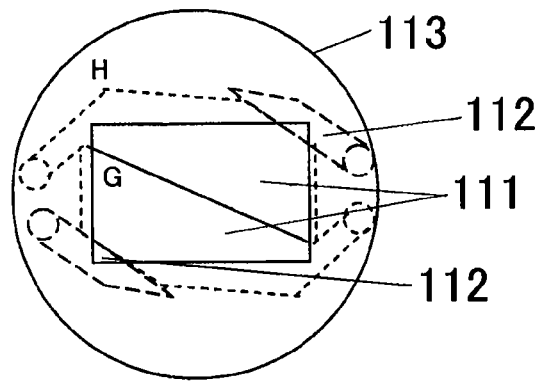
FIG. 15 *(PRIOR ART)*
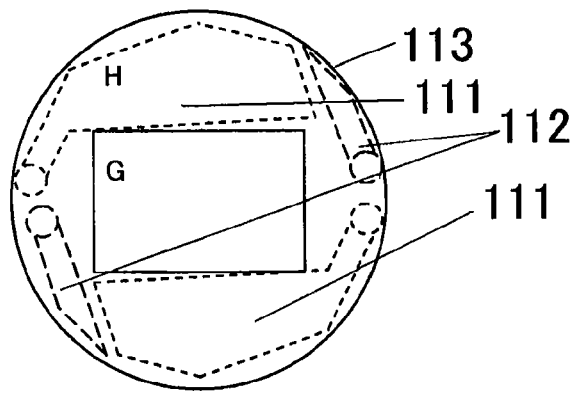
FIG. 16 *(PRIOR ART)*
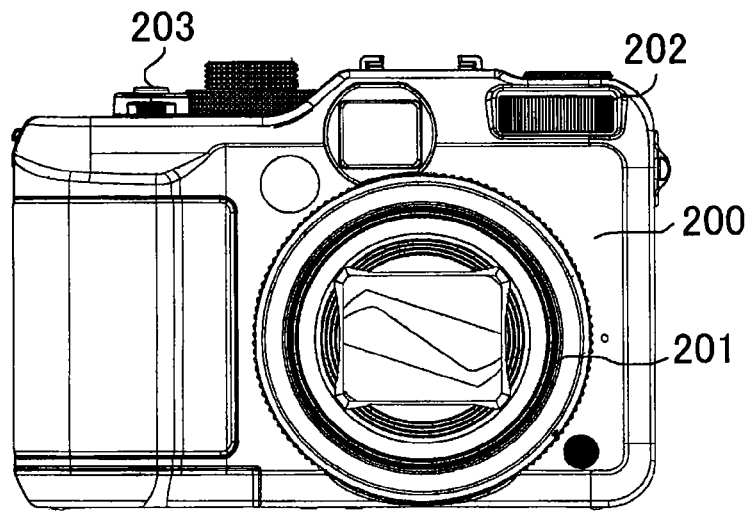
FIG. 17

US 8,016,497 B2

IMAGE PICKUP APPARATUS

BACKGROUND OF THE INVENTION

The present invention relates to an image pickup apparatus such as a digital still camera and a video camera, and more particularly to an image pickup apparatus which has a lens barrier mechanism for protecting its lens.

Lens barrier mechanisms include a built-in lens barrier mechanism that causes plural barrier blades incorporated in a lens barrel to move between an opening position where the barrier blades are retracted so as to open a front face (hereinafter also referred to as "lens front face") of the lens barrel and a closing position where the barrier blades are spread to cover the lens front face.

FIGS. 11, 13 and 14 show a conventional built-in lens barrier mechanism. FIG. 11 is a sectional view of a front part of a lens barrel cut by a plane passing through an optical axis of the lens barrel, which shows a state where first barrier blades 101 and second barrier blades 102 which are respectively provided in pairs are retracted to an opening position so as to overlap with each other in an optical axis direction. FIGS. 13 and 14 are front views of the lens barrel, which respectively show a state where the first and second barrier blades 101 and 102 are located at a closing position and a stare where the first and second barrier blades 101 and 102 are located at the opening position. A barrier cover 103 includes an opening portion G and a light shielding portion H, and covers an area other than an effective area of a front face of a lens 100 with the light shielding portion H.

One of the two first barrier blades 101 and one of the two second barrier blades 102 rotate around a common axis to move between the opening position and the closing position, and the other of the two first barrier blades 101 and the other of the two second barrier blades 102 rotate around a common axis to move therebetween.

Japanese Patent Laid-Open No. 2007-102086 discloses a built-in lens barrier mechanism in which three barrier blades made of metal, resin and metal are overlapped in this order to suppress increase in size of the mechanism in its optical axis direction, the increase in size being caused by increase of the number of the barrier blades.

Japanese Patent Laid-Open No. 2001-08357 discloses a built-in lens barrier mechanism that includes a pair of first barrier blades (main blades) and a pair of second barrier blades (sub blades), and each second barrier blade moves between an opening position and a closing position so as to follow movement of each first barrier blade.

Referring to FIGS. 12, 15 and 16, the built-in lens barrier mechanism disclosed in Japanese Patent Laid-Open No. 2001-083575 will be described briefly. FIG. 12 is a sectional view of a front part of a lens barrel cut by a plane passing through an optical axis of the lens barrel. The first barrier blade 111 and the second barrier blade (not shown in FIG. 12) are retracted to the opening position so as not to be overlapped with each other in an optical axis direction (that is, so as to be located on a same plane orthogonal to the optical axis). FIGS. 15 and 16 are front views of the lens barrel, which respectively show a state where the first and second barrier blades 111 and 112 are located at the closing position and a state where the first and second barrier blades 111 and 112 are located at the opening position. A barrier cover 113 includes an opening portion G and a light shielding portion H, and covers an area other than an effective area of a front face of a lens 100 with the light shielding portion H.

In the lens barrier mechanism disclosed in Japanese Patent Laid-Open No. 2001-083575, as described above, the first and second barrier blades 111 and 112 are retracted to the opening position so as not to be overlapped with each other in the optical axis direction, which makes it possible to reduce a thickness of the entire lens barrier mechanism.

In the built-in lens barrier mechanism, it is necessary to secure a space in the lens barrel into which the barrier blades are retreated from the lens front face when they are retracted to the opening position, which causes a problem of increase in outer diameter of the lens barrel.

As shown in FIG. 11, in the configuration where the plural barrier blades are overlapped in the optical axis direction to be retracted to the opening position at one side, a thickness in the optical axis direction of the entire lens barrier mechanism is increased. Thus, the opening portion of the barrier cover is located farther from the lens front face as compared with the case of FIG. 12 where the barrier blades are not overlapped in the optical axis direction. In a case where the opening portion of the barrier cover is located far from the lens front face, the opening portion has to be enlarged to prevent light rays at a same angle of view from being blocked by the barrier cover. As a result, the outer diameter of the lens barrel increases as the number of the barrier blades overlapped with each other in the optical axis direction increases.

As shown in FIG. 16, the retraction of the four barrier blades on a plane orthogonal to the optical axis at the opening position necessitates a larger area of the light shielding portion H more outside than the opening portion of the barrier cover, which results in increase of the outer diameter of the lens barrel.

As described above, in the lens barrier mechanisms disclosed in Japanese Patent Laid-Open Nos. 2007-102086 and 2001-083575, it is difficult to reduce the outer diameter of the lens barrel.

SUMMARY OF THE INVENTION

The present invention provides an image pickup apparatus that includes a lens barrier mechanism capable of miniaturizing a lens barrel.

The present invention provides as one aspect thereof an image pickup apparatus including a lens barrel, and two barrier blade groups each configured to include a first barrier blade, a second barrier blade and a third barrier blade, each barrier blade group being movable between a closing position for covering a front face of the lens barrel and an opening position for opening the front face of the lens barrel. In each of the barrier blade groups at the opening position, the first and second barrier blades overlap with each other in an optical axis direction of the lens barrel, and the third barrier blade overlaps with the first and second barrier blades in a direction orthogonal to the optical axis direction without overlapping therewith in the optical axis direction.

The present invention provides as another aspect thereof an image pickup apparatus including a lens barrel, two barrier blade groups each configured to include a first barrier blade, a second barrier blade and a third barrier blade, each barrier blade group being movable between a closing position for covering a front face of the lens barrel and an opening position for opening the front face of the lens barrel, a first biasing member and a second biasing member provided for each of the barrier blade groups, and a barrier diving member configured to drive the first barrier blades of the two barrier blade groups from the opening position to the closing position via the first biasing member. The third barrier blade is driven from the opening position to the closing position by the second biasing member, and the second barrier blade is driven from the opening position to the closing position by the third barrier blade driven by the second biasing member.

Other aspects of the present invention will become apparent from the following description and the attached drawings.

BRIEF DESCRIPTION OF THE DRAWINGS

FIG. 10 is a side view showing a relationship between a barrier driving ring and a movable cam barrel in the lens barrier mechanism of the embodiment.

FIG. 11 is a sectional view showing a conventional lens barrier mechanism.

FIG. 12 is a sectional view showing another conventional lens barrier mechanism.

FIG. 13 is a front view showing a barrier closed state of the lens barrier mechanism of FIG. 11.

FIG. 14 is a front view showing a barrier opened state of the lens barrier mechanism of FIG. 11.

FIG. 15 is a front view showing a barrier closed state of the lens barrier mechanism of FIG. 12.

FIG. 16 is a front view showing a barrier opened state of the lens barrier mechanism of FIG. 12.

FIG. 17 is a front view of a digital still camera that includes a lens barrel equipped with the lens barrier mechanism of the embodiment.

DESCRIPTION OF THE EMBODIMENTS

Exemplary embodiments of the present invention will hereinafter be described with reference to the accompanying drawings.

FIGS. 1 to 10 show a built-in lens barrier mechanism (hereinafter simply referred to as "barrier mechanism") disposed in a retractable lens barrel of an image pickup apparatus that is an embodiment of the present invention. An overall structure of the retractable lens barrel will be described below.

Figure 1:
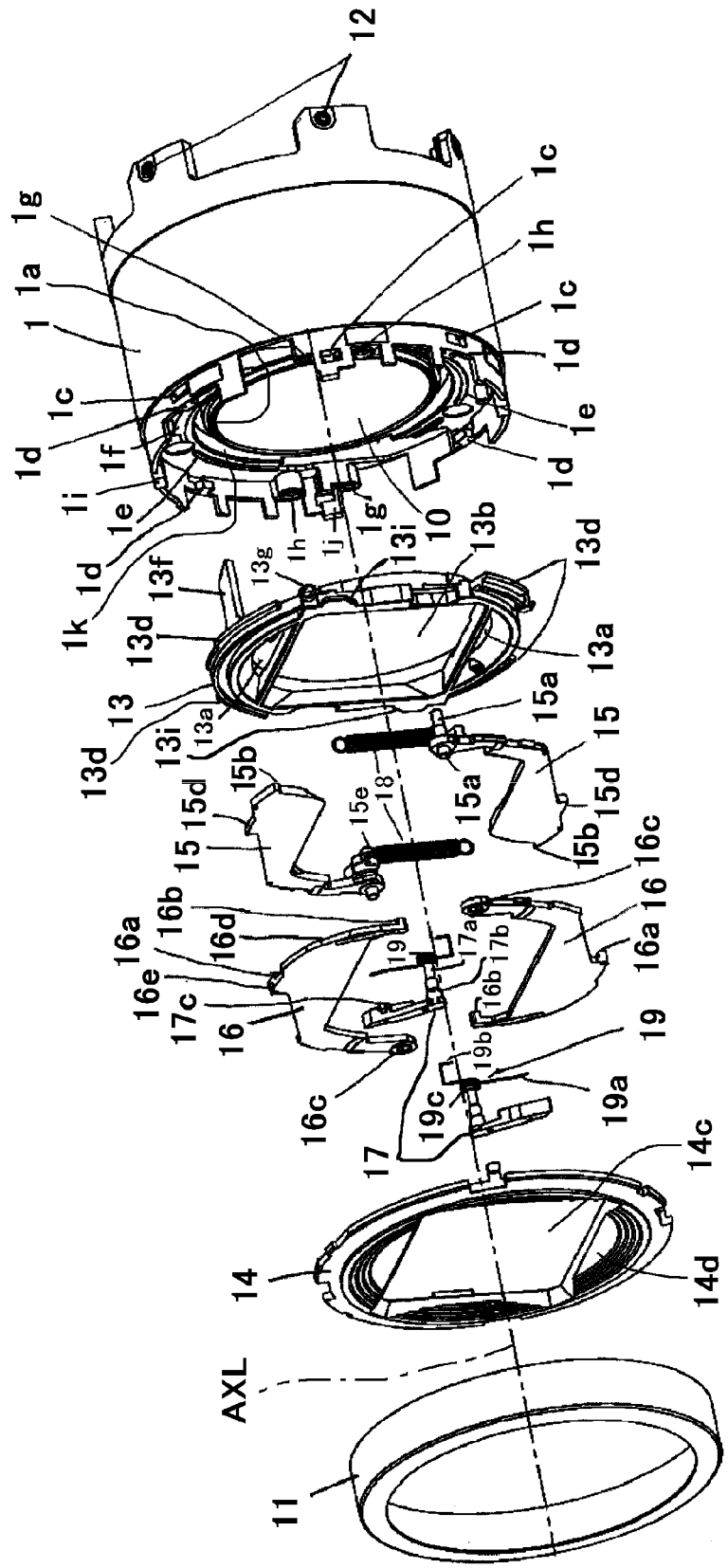
FIG. 1 is a front exploded perspective view of a lens barrier mechanism that is an embodiment of the present invention.
Figure 2:
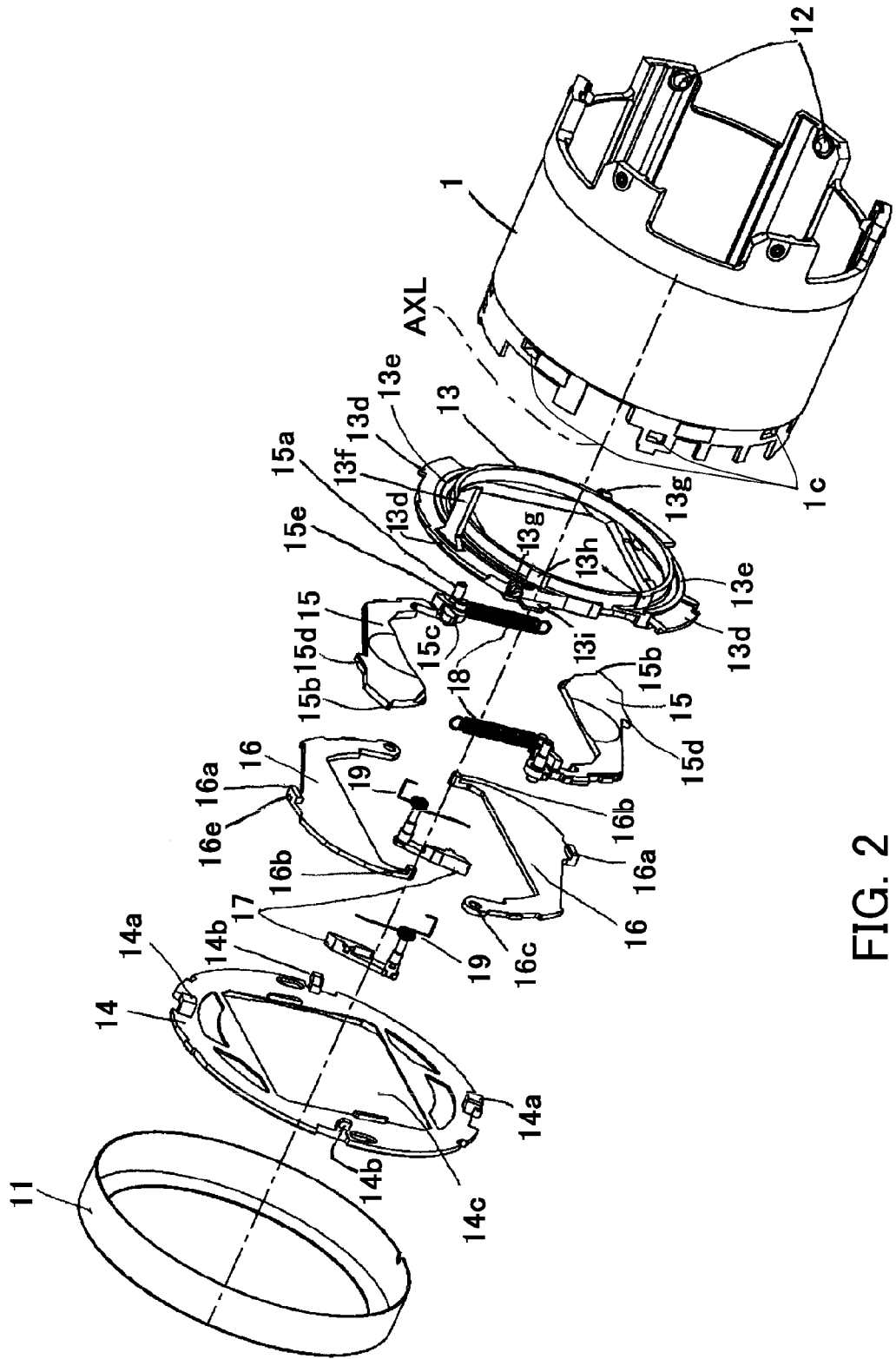
FIG. 2 is a back exploded perspective view of the lens barrier mechanism of the embodiment.
Figure 3:
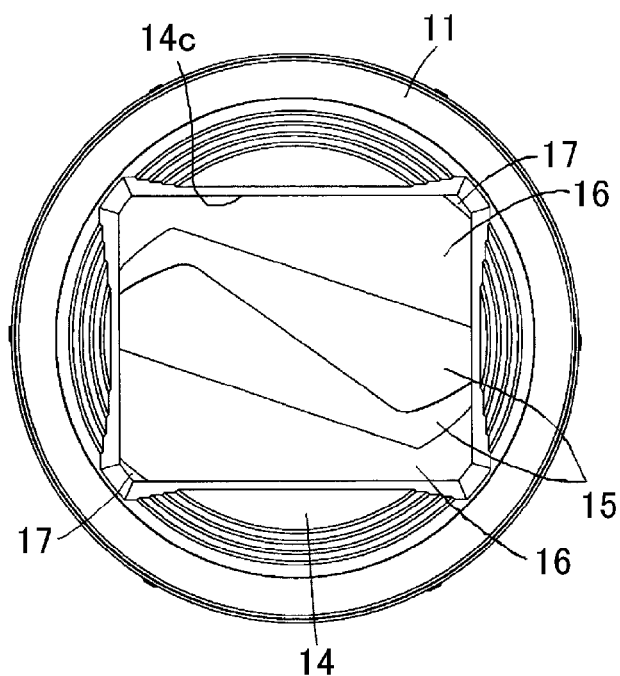
FIG. 3 is a front view showing the lens barrier mechanism of the embodiment in a barrier closed state.
Figure 4:
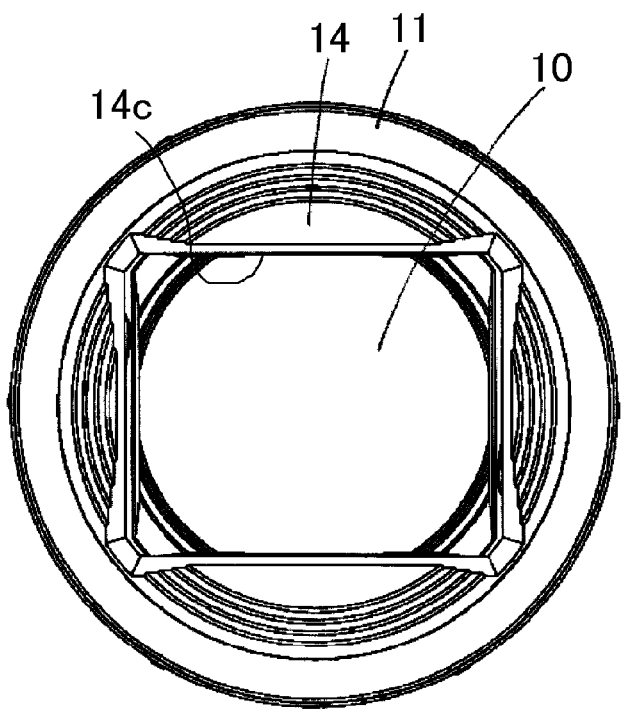
FIG. 4 is a front view showing the lens barrier mechanism of the embodiment in a barrier opened state.
Figure 5:
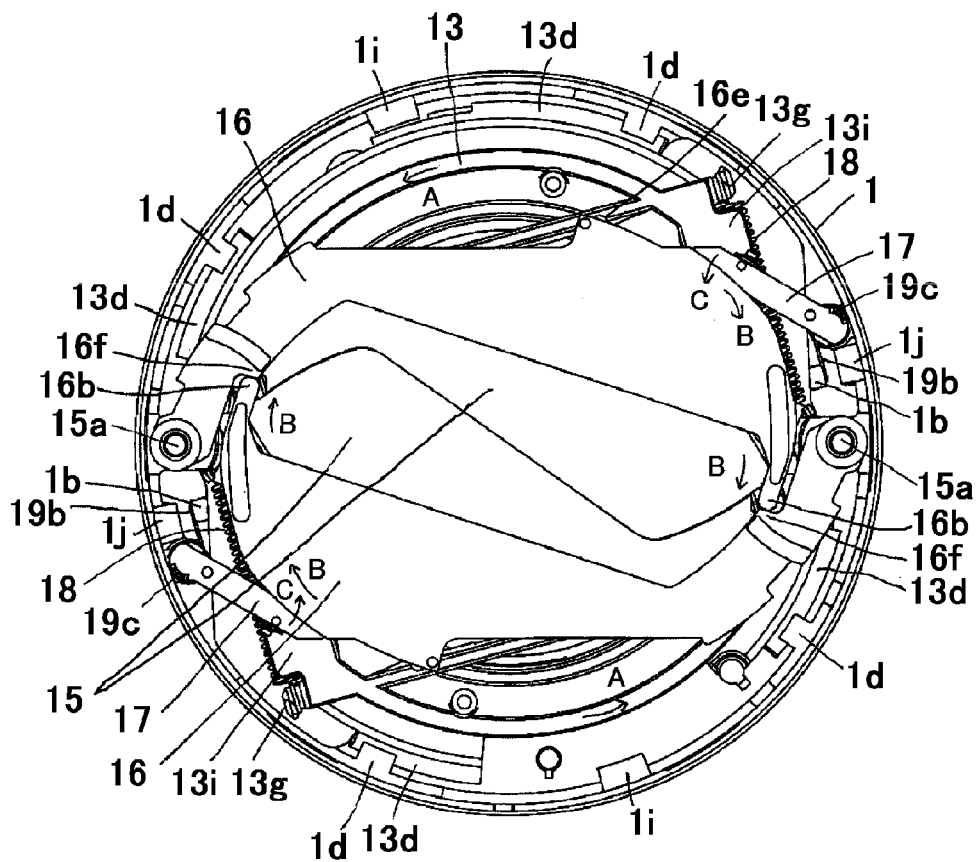
FIG. 5 is a front view showing the lens barrier mechanism (in which a barrier cover is removed) of the embodiment in the barrier closed state.
Figure 6:
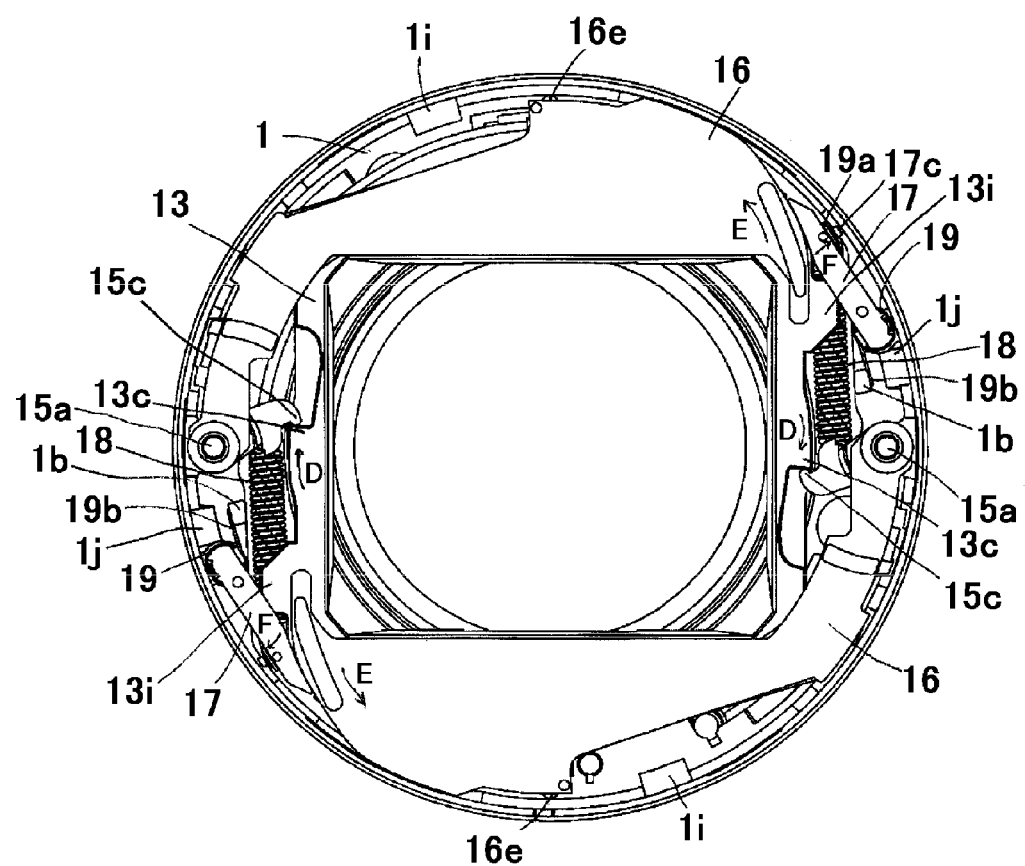
FIG. 6 is a front view showing the lens barrier mechanism (in which the barrier cover is removed) of the embodiment in the barrier opened state.
Figure 7:
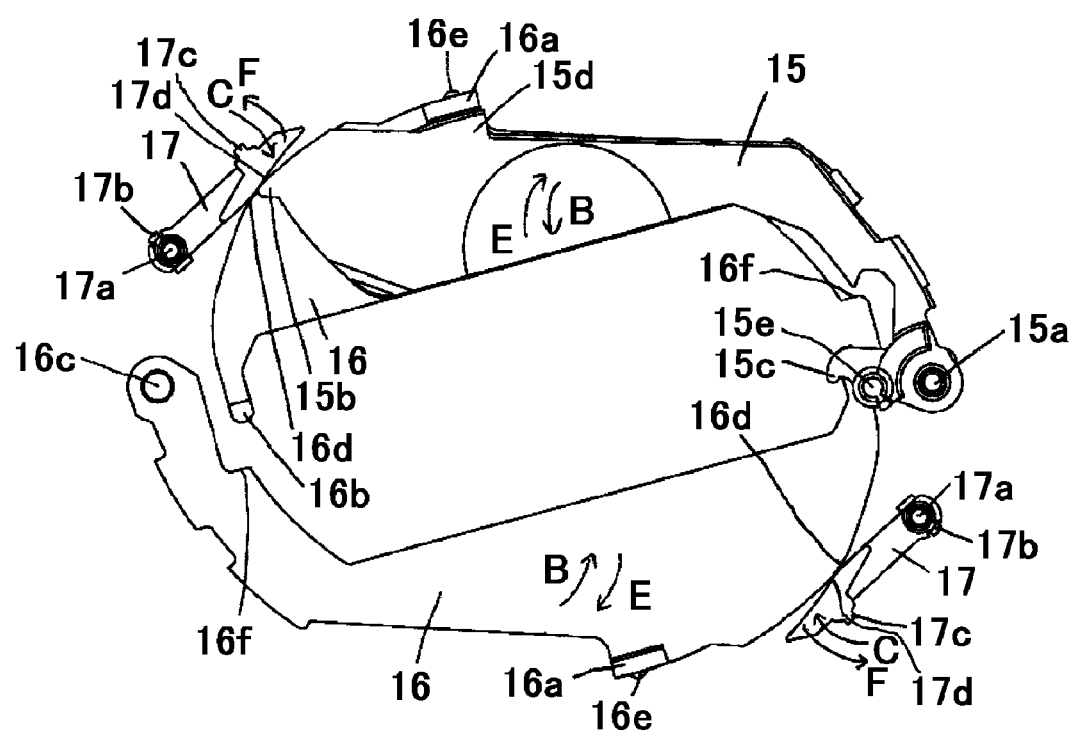
FIG. 7 is a back view showing movement of barrier blades in the lens barrier mechanism of the embodiment.
Figure 8:
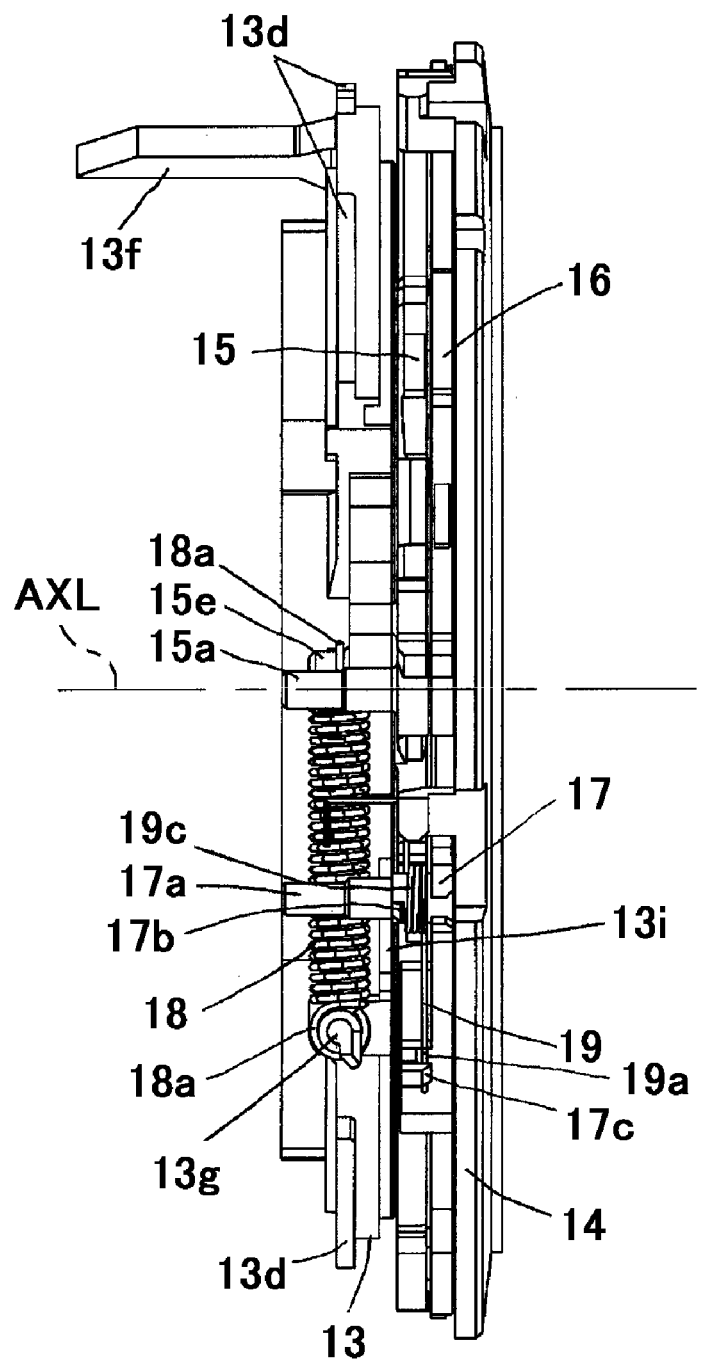
FIG. 8 is a side view of the lens barrier mechanism of the embodiment.

FIGS. 1 and 2 are exploded perspective views of the barrier mechanism of the embodiment. In FIGS. 1, 2 and 8, reference character AXL denotes an optical axis of the lens barrel. FIGS. 3 and 4 are front views of the barrier mechanism of the embodiment respectively in a closed state (hereinafter referred to as "barrier closed state" or "closing position") and an opened state (hereinafter referred to as "barrier opened state" or "opening position"). FIGS. 5 and 6 are front views of a first barrel respectively in the barrier closed state and the barrier opened state while a barrier cover is removed. FIG. 7 is a back view of barrier blades seen from an image plane side in a middle state between the barrier closed state and the barrier opened state.

Figure 9:
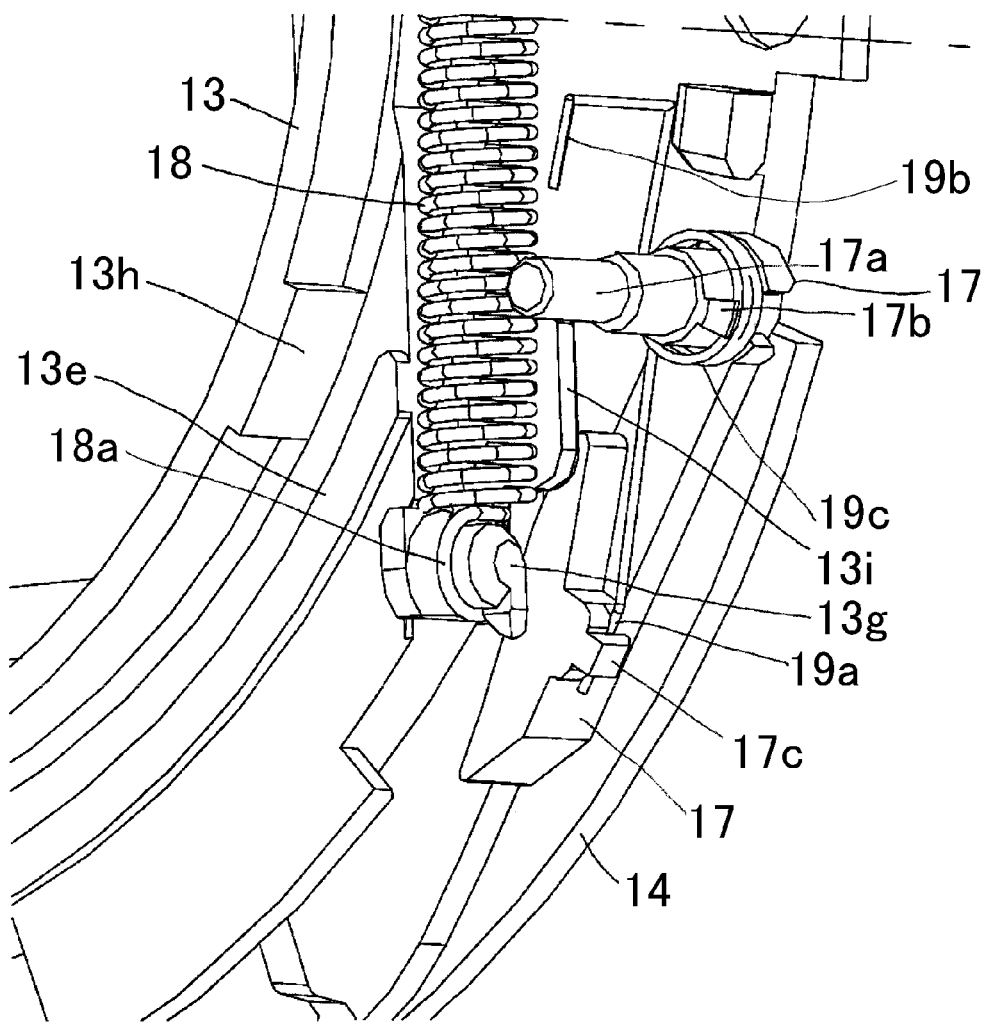
FIG. 9 is a partially enlarged perspective view of the lens barrier mechanism of the embodiment.

FIG. 8 is a side view showing a positional relationship of main components constituting the barrier mechanism of the embodiment. FIG. 9 is an enlarged perspective view of the barrier mechanism of the embodiment seen from the image plane side. FIG. 10 shows a relationship between a barrier driving ring and a movable cam barrel.

The barrier mechanism of the embodiment includes a barrier driving ring (barrier driving member) 13, a barrier cover 14, two inner barrier blades (first barrier blades) 15, two outer barrier blades (second barrier blades) 16 and two small barrier blades (third barrier blades) 17. The barrier mechanism further includes two coil springs (first biasing members) 18 and two torsion springs (second biasing members) 19. One inner barrier blade 15, one outer barrier blade 16 and one small barrier blade 17 constitute one barrier blade group, and the barrier mechanism has two such barrier blade groups. In other words, the barrier mechanism has totally six barrier blades. The coil spring 18 and the torsion spring 19 are provided for each barrier blade group.

As shown in FIG. 5, the barrier driving ring 13 includes flange portions 13d formed thereon at four places in its circumferential direction so as to protrude outward in its diameter direction. The flange portions 13d engage with bayonet claws 1d formed at four places on the first barrel 1 to constitute a bayonet coupling, which determines a position of the barrier driving ring 13 on an object side (or a subject side or a front side) in an optical axis direction. The first barrel 1 is a barrel member for holding a first lens unit 10 disposed closest to an object among lens units included in an image pickup optical system housed in the lens barrel.

Rails 13e formed on an image plane side surface (surface opposite to an object side surface) of the barrier driving ring 13 and rails 1e formed on the first barrel 1 are brought into contact with each other, which determines a position of the barrier driving ring 13 on an image plane side in the optical axis direction.

The barrier driving ring 13 is held by the first barrel 1 so as to be rotatable around the optical axis AXL by insertion of projections 13h formed at four places on the barrier driving ring 13 in its circumferential direction into circular-arc groove portions 1k formed in two arc areas in the first barrel 1 such that the projections 13h are brought into contact with (diametrically fitted to) outside inner circumferential surfaces of the circular-arc groove portions 1k.

The barrier driving ring 13 includes an opening portion 13b corresponding to an opening portion (hereinafter referred to as "cover opening portion") 14c formed in the barrier cover 14, and tapered hole portions 13a formed on both sides of the opening portion 13b in the diameter direction. Each tapered hole portion 13a is formed so as to become wider from the image plane side toward the object side. The two hole portions 13a are located more outside in the diameter direction than outer peripheral portions 15d of the inner barrier blades 15, and approximately more outside in the diameter direction than the outer barrier blades 16. The two hole portions 13a are formed more inside in the diameter direction than diametric fitting portions between the projections 13h of the barrier driving ring 13 and the circular-arc groove portions 1k of the first barrel 1, and contact portions (sliding portions) between the rails 13e and the rails 1e.

The barrier cover 14 includes the above-described cover opening portion 14c and a light shielding portion 14d. The cover opening portion 14c is formed so as to correspond to an effective opening (aperture) area in a front face of the first lens unit 10, the effective opening area (hereinafter simply referred to as "lens front face") being an area where a light flux effective for image pickup enters. The light shielding portion 14d is formed more outside than the cover opening portion 14c in the diameter direction. Two claws 14a and two claws 14b are formed on an outer peripheral portion of the barrier cover 14. The barrier cover 14 is rotated with respect to the first barrel 1 to cause the claws 14a and 14b to engage with bayonet claws 1i and 1j formed on the first barrel 1, which fixes the barrier cover 14 to the first barrel 1. In FIGS. 5 and 6, the barrier cover 14 is omitted.

The two inner barrier blades 15, the two outer barrier blades 16 and the two small barrier blades 17 are respectively rotated in mutually opposite directions to be moved between a closing position shown in FIG. 3 for closing the cover opening portion 14c to cover the lens front face and an opening position shown in FIG. 4 for opening the cover opening portion 14c and the lens front face. Both of these barrier blade groups protect the lens front face at the closing position.

In each barrier blade group located at the closing position, an area covered by the small barrier blade 17 in the lens front face is smaller than that covered by the inner barrier blade 15 and that covered by the outer barrier blade 16.

In the barrier opened state shown in FIG. 8, the inner barrier blade 15 and the outer barrier blade 16 are retracted to positions where they overlap with each other in the optical axis direction. On the other hand, the small barrier blade 17 is retracted to a position where it overlaps with the inner and outer barrier blades 15 and 16 in a direction orthogonal to the optical axis direction (that is, in the diameter direction) and does not overlap therewith in the optical axis direction.

Shafts 15a are formed on an object side surface and an image plane side surface at a base portion of the inner barrier blade 15. The image plane side shaft 15a is inserted into a hole portion 1h formed in the first barrel 1, while the object side shaft 15a is inserted into a hole portion 16c formed in the outer barrier blade 16. The inner barrier blade 15 and the outer barrier blade 16 are accordingly rotatable around the same shaft 15a (that is, around a same axis).

A shaft 17a is formed on an image plane side surface of at a base portion of the small barrier blade 17. As shown in FIG. 9, the shaft 17a has a large-diameter portion, an intermediate-diameter portion and a small-diameter portion from its base, and a claw 17b is formed on the large-diameter portion. The torsion spring 19 is mounted on the small barrier blade 17 by insertion of the shaft 17a into a coil portion 19c of the torsion spring 19 and engagement of the claw 17b with the coil 19c. The small barrier blade 17 is held by the first barrel 1 so as to be rotatable by insertion of the shaft 17a into a hole portion 1g formed in the first barrel 1.

One arm 19a of the torsion spring 19 engages with a claw 17c formed on a blade portion of the small barrier blade 17, while the other arm 19b engages with a column 1b (shown in FIGS. 5 and 6) formed on the first barrel 1. The small barrier blade 17 receives a biasing force from the torsion spring 19 in a direction of an arrow C (direction from the opening position to the closing position).

The coil spring 18 is a tension spring which includes at its both ends hook portions 18a facing directions orthogonal to each other as shown in FIG. 8. The coil spring 18 is mounted between the inner barrier blade 15 and the barrier driving ring 13 by hooking of the hook portions 18a on a spring hooking portion 15e of the inner barrier blade 15 and a spring hooking portion 13g of the barrier driving ring 13. The coil spring 18 is charged to apply a biasing force to the spring hooking portion 15e of the inner barrier blade 15 and the spring hooking portion 13g of the barrier driving ring 13 such that they are mutually drawn. In other words, the charged coil spring 18 biases the inner barrier blade 15 in a direction of an arrow B (direction from the opening position to the closing position) shown in FIG. 5, and also biases the barrier driving ring 13 in a direction opposite to the direction of an arrow A shown in FIG. 5 (that is, a direction of an arrow D shown in FIG. 6 which is a direction from the closing position to the opening position).

An interlock lever 13f formed on the image plane side surface of the barrier driving ring 13 penetrates a hole portion 1f formed in the first barrel 1. As shown in FIG. 10, during a retracting operation of the lens barrel (that is, during a closing operation of the barrier blade groups), the interlock lever 13f engages with a lever driving groove portion 71h formed in a movable cam barrel 71.

As shown in FIG. 7, when the inner barrier blade 15 is rotated in a direction of an arrow E (from the closing position to the opening position), the outer peripheral portion 15d of the inner barrier blade 15 engages with a claw 16a formed on the outer barrier blade 16. When the inner barrier blade 15 is rotated in the direction of the arrow B (from the opening position to the closing position), a tip portion 15b of the inner barrier blade 15 engages with a claw 16b formed on the outer barrier blade 16. This engagement rotates the outer barrier blade 16 in conjunction with the rotation of the inner barrier blade 15. The small barrier blade 17 is rotated by the biasing force of the torsion spring 19 in contact with an outer peripheral portion 16d of the outer barrier blade 16.

Flange portions 13i are formed on the barrier driving ring 13 near the spring hooking portions 13g. As shown in FIGS. 8 and 9, each flange portion 13i is formed between the torsion spring 19 and the coil spring 18. The small barrier blade 17 is disposed closer to the object than the flange portions 13i, and the coil spring 18 is disposed closer to an image plane than the flange portions 13i.

As shown in FIGS. 1 and 2, the bayonet claws 1d, 1i and 1j of the first barrel 1 are formed by slide forming in the direction orthogonal to the optical axis direction. On the first barrel 1, horizontal holes 1c for the slide forming are formed closer to the image plane than the bayonet claws 1d, 1i and 1j. The horizontal holes 1c are covered with a ring-shaped cover member 11, thereby preventing incursion of dusts between the barrier blade group and the lens front face through the horizontal holes 1c.

The first barrel 1 includes as through-holes only the hole portions 1h into which the shafts 15a of the inner barrier blades 15 are inserted, the hole portions 1g into which the shafts 17a of the small barrier blades 17 are inserted and a lens holding opening portion 1a for holding the first lens unit 10, in addition to the hole portion 1f. The hole portions 1h are covered with the shafts 15a of the inner barrier blade 15, and the lens holding opening portion 1a is covered with the first lens unit 10. The hole portion 1f into which the interlock lever 13f of the barrier driving ring 13 is inserted is always covered with one of the four flange portions 13d from the barrier opened state to the barrier closed state.

Next, description will be made of an operation of the barrier mechanism from the barrier opened state to the barrier closed state. The description will be made basically of movements of the inner, outer and small barrier blades 15, 16 and 17 in one of the two barrier blade groups.

As shown in FIG. 10, the movable cam barrel 71 includes the lever driving groove portion 71h at a position corresponding to the interlock lever 13f. The lever driving groove portion 71h pushes the interlock lever 13f, with rotation of the movable cam barrel 71 around the optical axis by a retraction operation of the lens barrel, to rotate the barrier driving ring 13 around the optical axis.

The movable cam barrel 71 thus pushes the interlock lever 13f from the barrier opened state shown in FIG. 6 to rotate the barrier driving ring 13 around the optical axis in the direction of the arrow A shown in FIG. 5. The rotation of the barrier driving ring 13 in the direction of the arrow A charges the coil spring 18. The inner barrier blade 15 is pulled by the biasing force of the coil spring 18 to be rotated around the shaft 15a in the direction of the arrow B. Thus, the barrier driving ring 13 rotationally drives the inner barrier blade 15 via the coil spring 18 toward the closing position.

The outer barrier blade 16 is not rotated until the tip portion 15b of the inner barrier blade 15 engages with the claw 16b of the outer barrier blade 16. While the outer barrier blade 16 is not rotated, the small barrier blade 17 biased in the direction of the arrow C via the arm 19a of the torsion spring 19 is brought into contact with the outer peripheral portion 16d of the outer barrier blade 16, and thereby the outer barrier blade 16 is also biased in the direction of the arrow C.

The biasing force of the torsion spring 19 is set lower than that of the coil spring 18. As compared with a rotation direction of the outer barrier blade 16 around the shaft 15a, a direction in which the small barrier blade 17 is brought into contact with the outer barrier blade 16 is closer to a direction orthogonal to the rotation direction. Thus, the outer barrier blade 16 is not yet rotated by the biasing force from the small barrier blade 17.

The engagement of the tip portion 15b of the inner barrier blade 15 with the claw 16b of the outer barrier blade 16 rotates the outer barrier blade 16 in the direction of the arrow B with the inner barrier blade 15. During the rotation of the outer barrier blade 16, the small barrier blade 17 is rotationally driven in the direction of the arrow C by the biasing force of the torsion spring 19 while keeping its contact with the outer peripheral portion 16d of the outer barrier blade 16.

The inner barrier blade 15 that has further rotated comes into contact with the inner barrier blade 15 in the other barrier blade group to stop. The outer barrier blade 16 receives the biasing force of the torsion spring 19 via the small barrier blade 17, and is rotationally driven in the direction of the arrow B by this biasing force. The outer barrier blade 16 stops at a position where the tip of the claw 16b comes into contact with a receiving portion 16f of the outer barrier blade 16 in the other barrier blade group. The small barrier blade 17 accordingly stops in a state where it biases the outer barrier blade 16. Thus, the two barrier blade groups close the cover opening portion 14c.

In the state where the two outer barrier blades 16 are in contact with each other to stop, each outer barrier blade 16 receives the biasing force from the torsion spring 19 via the small barrier blade 17 and the biasing force from the outer barrier blade 16 in the other barrier blade group. Each outer barrier blade 16 accordingly stops with a slight gap between the claw 16b and the tip portion 15b of the inner barrier blade 15. In this state, the two outer barrier blades 16 respectively receive the biasing forces in directions opposite to each other from the two torsion springs 19, and thus backlash of each outer barrier blade 16 does not occur. The small barrier blade 17 is biased to be brought into contact with the outer barrier blade 16, so that backlash of the small barrier blade 17 also does not occur. The inner barrier blade 15 receives the biasing force of the coil spring 18 to be brought into contact with the inner barrier blade 15 in the other barrier blade group, and thus backlash of the inner barrier blade 15 does not occur.

Next, description will be made of an operation from the barrier closed state to the barrier opened state. The movable cam barrel 71 is rotated from the barrier closed state shown in FIG. 5 with a protrusion operation of the lens barrel from its retracted state. The rotation of the movable cam barrel 71 releases pressing of the interlock lever 13f by the lever driving groove portion 71h. Thus, as shown in FIG. 6, the barrier driving ring 13 is rotated in the direction of the arrow D by the biasing force of the charged coil spring 18.

The rotation of the barrier driving ring 13 in the direction of the arrow D causes a wall 13c formed on the barrier driving ring 13 to press a projection 15c formed on the inner barrier blade 15. The inner barrier blade 15 accordingly receives a driving force in a direction of an arrow E to be rotated around the shaft 15a. At this point, the outer barrier blade 16 is biased by the torsion spring 19 via the small barrier blade 17, and thus the outer barrier blade 16 does not move for a while.

Further continuous rotation of the barrier driving ring 13 in the direction of the arrow D rotates the inner barrier blade 15 to a state shown in FIG. 7, and thereby the outer peripheral portion 15d of the inner barrier blade 15 comes into contact with the claw 16a of the outer barrier blades 16. The outer barrier blade 16 accordingly rotates around the shaft 15a (hole portion 16c) in the direction of the arrow E with the inner barrier blade 15. The rotation of the outer barrier blade 16 with the inner barrier blade 15 in the direction of the arrow E rotates the small barrier blade 17 having an outer peripheral portion 17d in contact with the outer peripheral portion 16d of the outer barrier blade 16 in a direction of an arrow F against the biasing force of the torsion spring 19.

Then, a convex portion 16e of the outer barrier blade 16 comes into contact with an inner circumferential surface of a circumferential wall of the first barrel 1, and thereby the rotation of the outer barrier blade 16, the inner barrier blade 15 and the small barrier blade 17 is stopped in the barrier opened state shown in FIGS. 6 and 8.

As described above, in the barrier mechanism of this embodiment, in each barrier blade group at the barrier opening position, the inner barrier blade 15 and the outer barrier blade 16 are disposed at positions where they overlap with each other in the optical axis direction. On the other hand, the small barrier blade 17 is disposed at a position where it overlaps with the inner barrier blade 15 and the outer barrier blade 16 in the diameter direction without overlapping therewith in the optical axis direction.

Further, the barrier mechanism of this embodiment includes the coil spring 18 and the torsion spring 19 provided for each barrier blade group, and the barrier driving ring 13 configured to drive the inner barrier blades 15 in the two barrier blade groups from the opening position to the closing position via the coil springs 18. The small barrier blade 17 is driven from the opening position to the closing position by the torsion spring 19. The outer barrier blade 16 is driven to the closing position by the small barrier blade 17 driven by the torsion spring 19.

This configuration enables efficient retraction of the six barrier blades in the optical axis direction and the diameter direction of the lens barrel even while the two barrier blade groups, i.e., the six barrier blades, are used. As a result, the diameter of the lens barrel can be reduced.

A thickness of the small barrier blade 17 may be set equal to or about equal to a total thickness of the inner barrier blade 15 and the outer barrier blade 16. Erroneous use such as insertion of a user's finger into the barrier mechanism in the barrier closed state may occur. Even in such a case, as long as the thickness of the small barrier blade 17 is set equal to or about equal to the total thickness of the inner barrier blade 15 and the outer barrier blade 16, there is no worry that the inner barrier blade 15 or the outer barrier blade 16 is pushed to the backside of the small barrier blade 17 to be overlapped therewith. In addition, when the thickness of the small barrier blade 17 is set as such, in the state shown in F FIG. 7, the outer peripheral portion 17d of the small barrier blade 17 may be brought into contact with both the tip portion 15b of the inner barrier blade 15 and the outer peripheral portion 16d of the outer barrier blade 16.

Moreover, in the barrier mechanism of this embodiment, the coil spring 18 and the torsion spring 19 are disposed at mutually different positions in the optical axis direction. This makes it possible to further reduce a size of the barrier mechanism in the diameter direction as compared with a case where the coil spring 18 and the torsion spring 19 are disposed in the same position in the optical axis direction.

Furthermore, in the barrier mechanism of this embodiment, the small barrier blade 17 and the torsion spring 19 are disposed closer to the object than the flange portions 13i formed on the barrier driving ring 13, and the coil spring 18 is disposed closer to the image plane than the flange portions 13i. In other words, the flange portions 13i serve as partition walls between the small barrier blades 17 and the torsion springs 19, and the coil springs 18. This makes it possible to prevent interference of the small barrier blades 17 and the torsion springs 19 with the coil springs 18.

Further, in this embodiment, in the barrier closed state, an area in the lens front face covered by the small barrier blade 17 which does not overlap with the inner and outer barrier blades 15 and 16 in the optical axis direction in the barrier opened state is smaller than that covered by the inner and outer barrier blades 15 and 16 which are retracted so as to overlap with each other in the optical axis direction in the barrier opened state. This makes it possible to retract each barrier blade group more compactly as compared with an area to be covered in the cover opening portion 14c (lens front face) in the barrier closed state, which can reduce the outer diameter of the barrier cover 14, that is, the outer diameter of the lens barrel.

Next, description will be made of a configuration of an image pickup apparatus including a lens barrel equipped with the barrier mechanism configured as described above, and a configuration of the lens barrel.

A digital still camera as an image pickup apparatus includes, as shown in FIG. 17, a camera body 200, a lens barrel 201 having the above-described barrier mechanism, a flash unit 202 and an image pickup button 203. The lens barrel 201 operates, in response to turn-on of a power switch (not shown) provided on the camera body 200, so as to protrude with respect to the camera body 200 toward the object side from a retracted state to a protruded state (image pickup state). When the power switch is turned off, the lens barrel 201 operates so as to retract from the protruded state to the retracted state.

In the image pickup state, when the image pickup button 203 is pressed, an object image formed by an image pickup optical system in the lens barrel 201 is converted into an electric signal by an image pickup element (photoelectric conversion element such as a CCD sensor or a CMOS sensor, not shown in FIG. 17) to generate image data. When the object is dark, the flash unit 202 emits light to illuminate the object.

Figure 18:
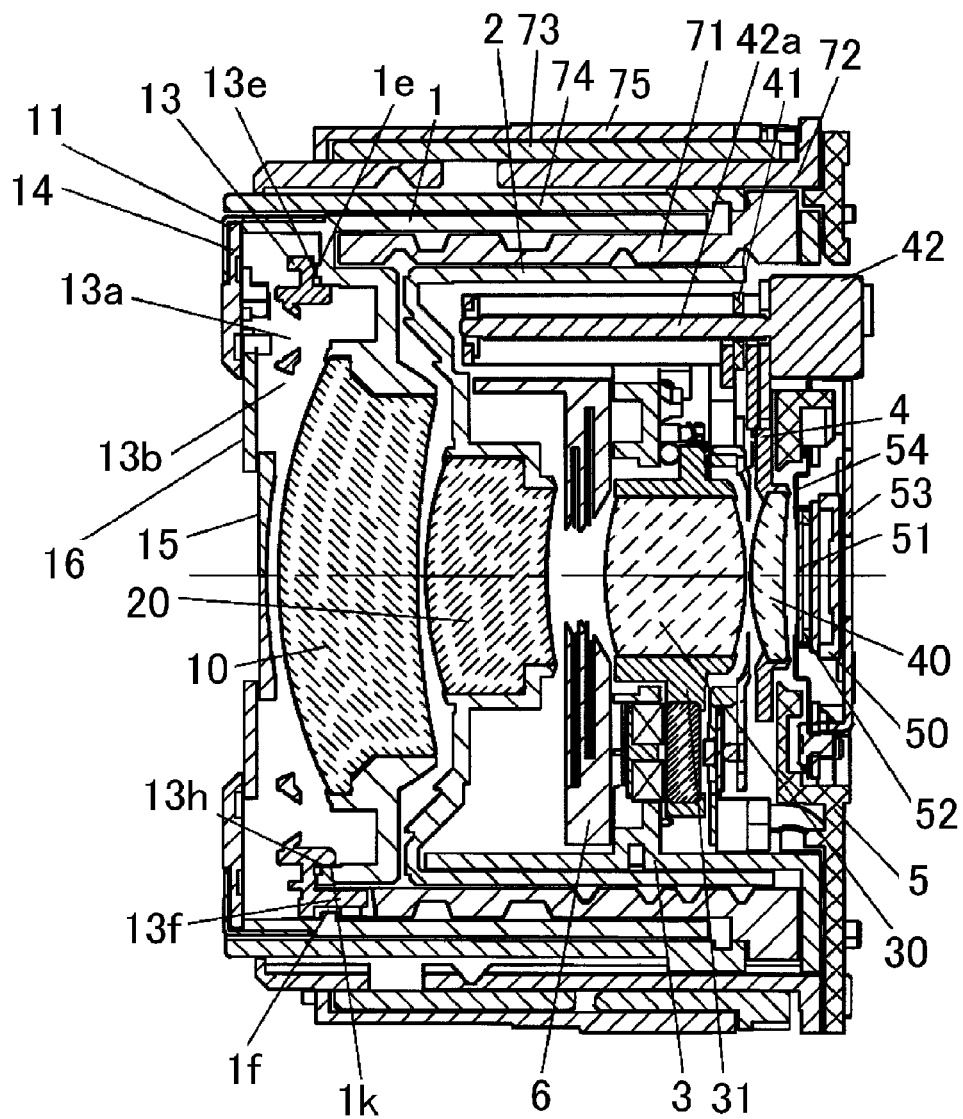
FIG. 18 is a sectional view showing an internal configuration of the lens barrel (in a retracted state) equipped with the lens barrier mechanism of the embodiment.
Figure 19:
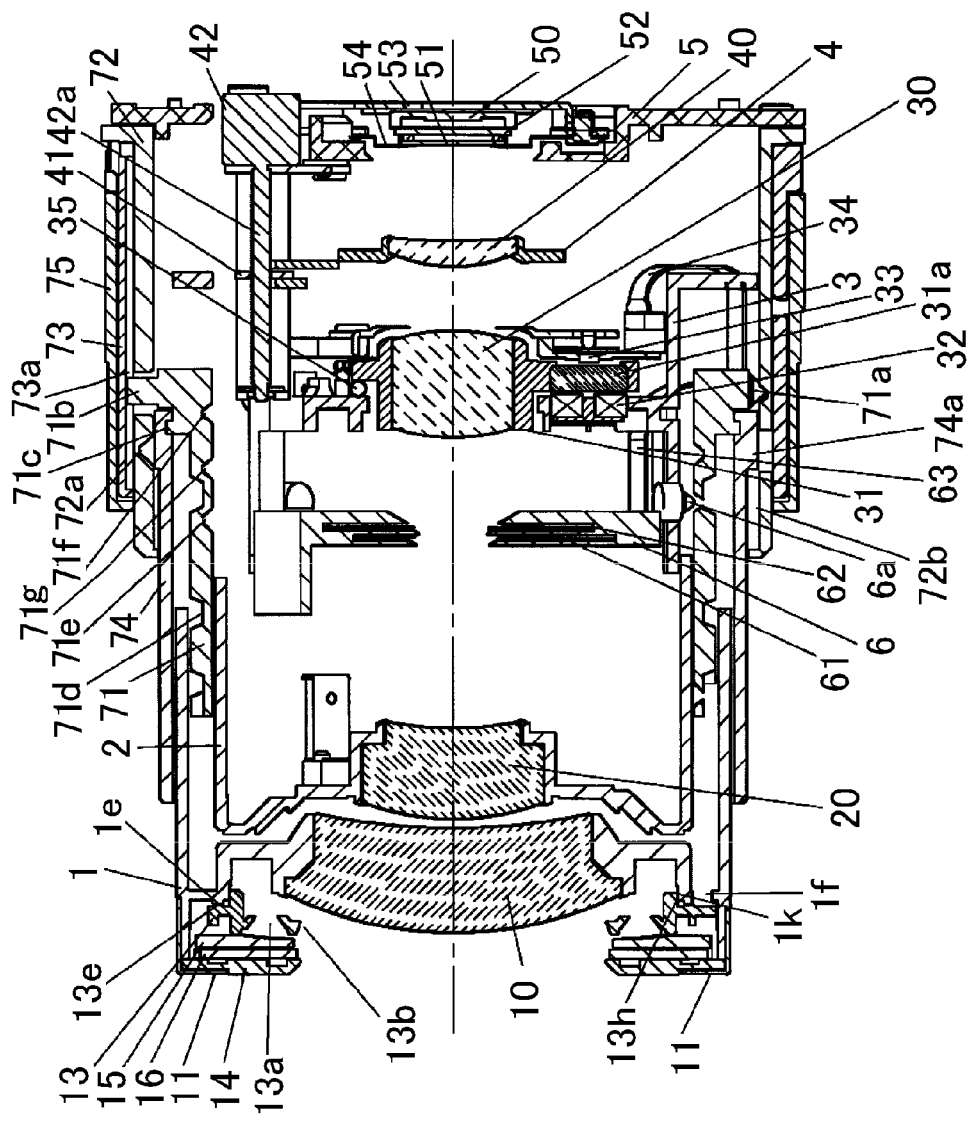
FIG. 19 is a sectional view showing an internal configuration of the lens barrel (in a wide-angle state) equipped with the lens barrier mechanism of the embodiment.

FIGS. 18 and 19 show an internal configuration of the lens barrel respectively in the retracted state and a wide-angle state as one image pickup state.

The lens barrel includes a first barrel 1, a second barrel 2, a third barrel 3, a fourth barrel 4, an image pickup element holder 5, a stop/shutter unit 6, the movable cam barrel 71, a driving barrel 73, a straight-movable barrel 74 and a cover barrel 75 which is an exterior member for covering the entire lens barrel.

The first barrel 1 holds the first lens unit 10 at the lens holding opening portion 1a, and moves integrally with the first lens unit 10 in the optical axis direction. Cam pins (not shown) are provided at an image plane side portion of an inner circumferential surface of the first barrel 1.

The barrier mechanism is incorporated into the first barrel 1 after the first lens unit 10 is fixed to the first barrel 1, and a cover member 11 is lastly attached to the first barrel 1.

The second barrel 2 holds a second lens unit 20. Cam pins (not shown) provided on the second barrel 2 engage with cam groove portions 71e formed on the movable cam barrel 71.

The third barrel 3 holds a third lens holding frame 31 holding a third lens unit 30 to allow its shifting in a direction orthogonal to the optical axis. The third lens holding frame 31 holds two magnets (only one magnet is shown in the figures) 31a at two circumferential places whose phases are different from each other by 90 degrees. The third lens holding frame 31 is pressed in the optical axis direction to the third barrel 3 by a biasing force of a spring (not shown) via three balls 35 sandwiched therebetween.

The third barrel 3 includes two coils 32 and two hall elements 33 respectively disposed at positions facing the magnets 31a on both side thereof in the optical axis direction. The coils 32 and the hall elements 33 are connected to a control board (not shown) via a flexible board 34. Energization of the coil 32 via the flexible board 34 generates an electromagnetic force between the coil 32 and the magnet 31a to shift the third lens holding frame 31 in the direction orthogonal to the optical axis. The balls 35 guide the shift of the third lens holding frame 31.

Each of the hall elements 33 outputs a signal according to a positional change of the magnet 31a held by the third lens holding frame 31, and thus a shifting amount of the third lens holding frame 31 can be detected based on the output signal.

Cam pins (not shown) are provided on the third barrel 3. The cam pins engage with cam groove portions 71f formed on an inner circumferential surface of the movable cam barrel 71.

The fourth barrel 4 holds a fourth lens unit 40. The fourth barrel 4 is held by two guide bars (not shown) so as to be movable in the optical axis direction. A lead screw 42a is formed on an output shaft of an AF motor 42. A nut 41 fixed to the fourth barrel 4 engages with the lead screw 42a. The AF motor 42 rotates the output shaft (lead screw 42a) to move the fourth barrel 4 in the optical axis direction by the engagement of the screw 42a and the nut 41.

The image pickup element holder 5 holds the image pickup element 50. An elastic member 52 such as a rubber member is disposed on the object side of the image pickup element 50. An IR-cut filter 51 is disposed between the elastic member 52 and the image pickup element 50.

The elastic member 52, the IR-cut filter 51 and the image pickup element 50 are sandwiched between an IR plate 54 and an image pickup element plate 53 to be formed into a unit. This unit is fixed to the image pickup element holder 5 by screws (not shown).

The stop/shutter unit 6 is connected to the control board via a flexible substrate 63. The stop/shutter unit 6 includes two shutter blades 61 on its object side, and six stop blades 62 on its image plane side. The two shutter blades 61 are opened and closed by electromagnetic drive to control an exposure amount of the image pickup element 50. The six stop blades 62 are opened and closed by a motor (not shown) to change an aperture diameter so as to adjust an amount of light passing through a stop aperture formed by the six stop blades 62.

Cam pins 6a are provided on the stop/shutter unit 6. The cam pins 6a engage with cam groove portions 71g formed on the inner circumferential surface of the movable cam barrel 71.

The movable cam barrel 71 includes the above-described lever driving groove portion 71h and cam groove portions 71d which are formed on its outer circumferential surface, and the above-described cam groove portions 71e, 71f and 71g formed on its inner circumferential surface. Cam pins 71a, driving pins 71b and claws 71c are formed on the movable cam barrel 71.

The fixed barrel 72 includes cam groove portions 72a formed on its inner circumferential surface, and the cam pins 71a of the movable cam barrel 71 engage with the cam groove portions 72a.

The driving barrel 73 is disposed at an outer periphery of the fixed barrel 72 so as to be rotatable around the optical axis. A gear (not shown) is integrally formed on an outer circumferential surface of the driving barrel 73. The gear is connected to a PZ motor (not shown) via a reduction mechanism (not shown).

The straight-movable barrel 74 includes a key 74a at its image plane side end. The key 74a engages with a key groove portion 72b formed on the inner circumferential surface of the fixed barrel 72. Thus, the straight-movable barrel 74 can move along the key groove portion 72b in the optical axis direction while its rotation with respect to the fixed barrel 72 is prevented.

The claws 71c formed on the movable cam barrel 71 engage with a groove portion formed at the image plane side end on the inner circumferential surface of the straight-movable barrel 74 so as to extend in the circumferential direction. Thus, the straight-movable barrel 74 moves in the optical axis direction without rotating integrally with the movable cam barrel 71 which moves in the optical axis direction with rotation.

Next, description will be made of operations of the lens barrel thus configured. Rotary drive of the PZ motor causes rotation of the driving barrel 73 around the optical axis. The driving barrel 73 includes straight groove portions 73a formed on its inner circumferential surface so as to extend in the optical axis direction. The driving pins 71b of the movable cam barrel 71 engage with the straight groove portions 73a, and thus the movable cam barrel 71 rotates integrally with the rotation of the driving barrel 73. The cam pins 71a engage with the cam groove portions 72a formed on the fixed barrel 72, and thus the movable cam barrel 71 moves in the optical axis direction with rotation.

The rotation of the movable cam barrel 71 gives a driving force in the optical axis direction to cam pins 12 (shown in FIGS. 1 and 2) provided on the inner circumferential surface of the first barrel 1 by lifts of the cam groove portions 71d formed on the outer circumferential surface of the movable cam barrel 71. A straight key (not shown) provided on the first barrel 1 moves along a straight groove portion (not shown) formed on the straight-movable barrel 74. Thus, the first barrel 1 moves in the optical axis direction without rotation.

The rotation of the movable cam barrel 71 moves the second barrel 2, the third barrel 3 and the stop/shutter unit 6 in the optical axis direction by lifts of the cam groove portions 71e, 71f and 71g. The second barrel 2, the third barrel 3 and the stop/shutter unit 6 are prevented from being rotated around the optical axis by a straight guiding mechanism (not shown).

The lens barrel thus operates from the retracted state to the wide-angle state, and can operate for zooming between the wide-angle state and a telephoto state. Moving the fourth barrel 4 in the optical axis direction by the AF motor 42 enables focusing.

Furthermore, the present invention is not limited to these embodiments and various variations and modifications may be made without departing from the scope of the present invention.

For example, the embodiment has described the digital still camera having the built-in lens barrier mechanism. However, the present invention can be applied to other image pickup apparatus such as a video camera.

This application claims the benefit of Japanese Patent Application No. 2008-236454, filed on Sep. 16, 2008, which is hereby incorporated by reference herein in its entirety.

What is claimed is:

1. An image pickup apparatus comprising:
   a lens barrel; and
   two barrier blade groups each configured to include a first barrier blade, a second barrier blade and a third barrier blade, each barrier blade group being movable between a closing position for covering a front face of the lens barrel and an opening position for opening the front face of the lens barrel,
   wherein, in each of the barrier blade groups at the opening position, the first and second barrier blades overlap with each other in an optical axis direction of the lens barrel, and the third barrier blade overlaps with the first and second barrier blades in a direction orthogonal to the optical axis direction without overlapping therewith in the optical axis direction.

2. An image pickup apparatus according to claim 1, further comprising:
   a first biasing member and a second biasing member provided for each of the barrier blade groups; and
   a barrier diving member configured to drive the first barrier blades of the two barrier blade groups from the opening position to the closing position via the first biasing member,
   wherein the third barrier blade is driven from the opening position to the closing position by the second biasing member, and
   wherein the second barrier blade is driven from the opening position to the closing position by the third barrier blade driven by the second biasing member.

3. An image pickup apparatus according to claim 2,
   wherein the first biasing member and the second biasing member are disposed at positions different from each other in the optical axis direction.

4. An image pickup apparatus according to claim 1,
   wherein, in each of the barrier blade groups located at the closing position, an area covered by the third barrier blade in the front face of the lens barrel is smaller than that covered by each of the first and second barrier blades.

5. An image pickup apparatus comprising:
   a lens barrel;
   two barrier blade groups each configured to include a first barrier blade, a second barrier blade and a third barrier blade, each barrier blade group being movable between a closing position for covering a front face of the lens barrel and an opening position for opening the front face of the lens barrel, a first biasing member and a second biasing member provided for each of the barrier blade groups; and a barrier diving member configured to drive the first barrier blades of the two barrier blade groups from the opening position to the closing position via the first biasing member, wherein the third barrier blade is driven from the opening position to the closing position by the second biasing member, and wherein the second barrier blade is driven from the opening position to the closing position by the third barrier blade driven by the second biasing member.

6. An image pickup apparatus according to claim 5, wherein the first biasing member and the second biasing member are disposed at positions different from each other in the optical axis direction.

7. An image pickup apparatus according to claim 5, wherein, in each of the barrier blade groups located at the closing position, an area covered by the third barrier blade in the front face of the lens barrel is smaller than that covered by each of the first and second barrier blades.

* * * * *